(12) United States Patent
Evulet

(10) Patent No.: US 10,800,538 B2
(45) Date of Patent: Oct. 13, 2020

(54) EJECTOR AND AIRFOIL CONFIGURATIONS

(71) Applicant: Jetoptera, Inc., Edmonds, WA (US)

(72) Inventor: Andrei Evulet, Edmonds, WA (US)

(73) Assignee: JETOPTERA, INC., Edmonds, WA (US)

( * ) Notice: Subject to any disclaimer, the term of this patent is extended or adjusted under 35 U.S.C. 154(b) by 0 days.

(21) Appl. No.: 15/221,439

(22) Filed: Jul. 27, 2016

(65) Prior Publication Data
US 2017/0057648 A1 Mar. 2, 2017

Related U.S. Application Data

(60) Provisional application No. 62/213,465, filed on Sep. 2, 2015.

(51) Int. Cl.
*B64C 9/38* (2006.01)
*B64C 21/00* (2006.01)
(Continued)

(52) U.S. Cl.
CPC .............. *B64D 33/04* (2013.01); *B64C 9/38* (2013.01); *B64C 15/00* (2013.01); *B64C 15/14* (2013.01); *B64C 21/00* (2013.01); *B64C 21/04* (2013.01); *B64C 23/005* (2013.01); *B64C 39/024* (2013.01); *B64D 27/10* (2013.01); *B64D 27/18* (2013.01); *B64D 29/02* (2013.01); *B64D 33/02* (2013.01); *F02C 3/04* (2013.01); *F02C 6/04* (2013.01); *F02K 1/002* (2013.01); *F02K 1/36* (2013.01); *B64C 2201/10* (2013.01); *B64C 2201/104* (2013.01); *B64C 2230/04* (2013.01); *B64C 2230/16* (2013.01);
(Continued)

(58) Field of Classification Search
CPC ......... B64C 9/38; B64C 21/025; B64C 21/04; B64C 21/08; B64C 2230/04; B64C 2230/06; B64D 27/18
See application file for complete search history.

(56) References Cited

U.S. PATENT DOCUMENTS 1,495,185 A 5/1924 Kirgan
1,891,166 A 12/1932 Leupold
(Continued)

FOREIGN PATENT DOCUMENTS

CN 202508281 U 10/2012
CN 102991669 B 3/2013
(Continued)

OTHER PUBLICATIONS

International Search Report and Written Opinion, Application No. PCT/US2016/44326, dated Jun. 5, 2017, 19 pages.
(Continued)

*Primary Examiner* — Philip J Bonzell
*Assistant Examiner* — Tye William Abell
(74) *Attorney, Agent, or Firm* — Fostser Garvey PC; P. G. Scott Born

(57) ABSTRACT

A propulsion system coupled to a vehicle. The system includes an ejector having an outlet structure out of which propulsive fluid flows at a predetermined adjustable velocity. A control surface having a leading edge is located directly downstream of the outlet structure such that propulsive fluid from the ejector flows over the control surface.

14 Claims, 10 Drawing Sheets

(51) Int. Cl.

| | | |
|---|---|---|
| *B64D 27/18* | (2006.01) | |
| *B64D 33/04* | (2006.01) | |
| *B64C 39/02* | (2006.01) | |
| *B64C 15/14* | (2006.01) | |
| *B64C 15/00* | (2006.01) | |
| *B64D 27/10* | (2006.01) | |
| *B64C 21/04* | (2006.01) | |
| *F02K 1/36* | (2006.01) | |
| *F02K 1/00* | (2006.01) | |
| *F02C 3/04* | (2006.01) | |
| *F02C 6/04* | (2006.01) | |
| *B64C 23/00* | (2006.01) | |
| *B64D 29/02* | (2006.01) | |
| *B64D 33/02* | (2006.01) | |

(52) U.S. Cl.
CPC .. *B64D 2033/0273* (2013.01); *F05D 2220/90* (2013.01); *Y02T 50/166* (2013.01); *Y02T 50/32* (2013.01); *Y02T 50/44* (2013.01)

(56) References Cited

U.S. PATENT DOCUMENTS

| | | | |
|---|---|---|---|
| 2,585,676 A | 2/1952 | Poisson-Quinton | |
| 2,593,420 A | 4/1952 | Diehl | |
| 2,684,817 A | 7/1954 | Roy | |
| 2,796,731 A | 6/1957 | Morley | |
| 2,870,600 A | 1/1959 | Brown | |
| 2,885,162 A | 5/1959 | Griswold | |
| 2,922,277 A | 1/1960 | Bertin | |
| 2,928,238 A | 3/1960 | Hawkins, Jr. | |
| 2,988,303 A | 6/1961 | Coanda | |
| 2,989,845 A | 6/1961 | Howald | |
| 3,028,121 A | 4/1962 | Klapproth | |
| 3,045,947 A | 7/1962 | Bertin et al. | |
| 3,047,208 A | 7/1962 | Coanda | |
| 3,051,413 A * | 8/1962 | Pouit | B64C 23/005 |
| | | | 244/12.5 |
| 3,055,614 A | 9/1962 | Thompson | |
| 3,085,770 A | 4/1963 | Sutton | |
| 3,098,352 A | 7/1963 | Taub et al. | |
| 3,116,041 A | 12/1963 | Hoerrner | |
| 3,161,377 A | 12/1964 | Balluff | |
| 3,174,707 A | 3/1965 | Ricard | |
| 3,216,653 A | 11/1965 | Nabour | |
| 3,318,097 A | 5/1967 | Wood et al. | |
| 3,326,500 A | 6/1967 | Lanier | |
| 3,330,500 A * | 7/1967 | Winborn | B64C 29/0025 |
| | | | 244/12.5 |
| 3,337,121 A | 8/1967 | Coanda | |
| 3,347,495 A | 10/1967 | Eberhardt et al. | |
| 3,396,538 A | 8/1968 | Wetherbee, Jr. | |
| 3,441,218 A | 4/1969 | Bucher | |
| 3,525,474 A | 8/1970 | Von Ohain et al. | |
| 3,545,701 A | 12/1970 | Bertin et al. | |
| 3,605,939 A | 9/1971 | Duthion | |
| 3,664,611 A | 5/1972 | Harris | |
| 3,667,680 A | 6/1972 | Weed | |
| 3,685,614 A | 8/1972 | Coanda et al. | |
| 3,694,107 A | 9/1972 | Stein | |
| 3,722,454 A | 3/1973 | Silvester | |
| 3,747,855 A | 7/1973 | Vdoviak et al. | |
| 3,756,542 A * | 9/1973 | Bertin | B64C 23/005 |
| | | | 244/216 |
| 3,770,227 A | 11/1973 | Von Ohain et al. | |
| 3,795,367 A | 3/1974 | Mocarski | |
| 3,829,044 A | 8/1974 | Leslie et al. | |
| 3,831,887 A | 8/1974 | Fosness | |
| 3,834,834 A | 9/1974 | Quinn | |
| 3,860,200 A | 1/1975 | Petrushka | |
| 3,879,939 A | 4/1975 | Markowski | |
| 3,885,891 A | 5/1975 | Throndson | |
| 3,887,146 A | 6/1975 | Bright | |
| 3,893,638 A * | 7/1975 | Kelley | B64C 15/00 |
| | | | 244/12.5 |
| 3,926,373 A | 12/1975 | Viets | |
| 3,941,335 A | 3/1976 | Viets | |
| 4,019,696 A | 4/1977 | Hirt et al. | |
| 4,030,289 A | 6/1977 | Kampe | |
| 4,030,687 A | 6/1977 | Hapke | |
| 4,099,691 A | 7/1978 | Swanson et al. | |
| 4,257,224 A | 3/1981 | Wygnanski et al. | |
| 4,311,291 A | 1/1982 | Gilbertson et al. | |
| 4,332,529 A | 6/1982 | Alperin | |
| 4,392,621 A | 7/1983 | Viets | |
| 4,398,683 A | 8/1983 | Schmetzer | |
| 4,398,687 A | 8/1983 | Nichols, Jr. et al. | |
| 4,445,338 A | 5/1984 | Markowski et al. | |
| 4,448,354 A | 5/1984 | Reznick et al. | |
| 4,477,039 A | 10/1984 | Boulton et al. | |
| 4,478,378 A * | 10/1984 | Capuani | B64C 3/50 |
| | | | 244/12.5 |
| 4,482,108 A * | 11/1984 | Sutton | B64C 29/0083 |
| | | | 244/12.4 |
| 4,592,202 A | 6/1986 | Stewart et al. | |
| 4,645,140 A | 2/1987 | Bevilaqua et al. | |
| 4,648,571 A | 3/1987 | Gerhardt | |
| 4,666,104 A | 5/1987 | Kelber | |
| 4,721,126 A | 1/1988 | Horii | |
| 4,767,083 A * | 8/1988 | Koenig | B64C 21/025 |
| | | | 244/12.3 |
| 4,815,942 A | 3/1989 | Alperin et al. | |
| 4,819,876 A | 4/1989 | Thayer | |
| 4,840,329 A | 6/1989 | Szuminski et al. | |
| 4,848,701 A | 7/1989 | Belloso | |
| 4,941,628 A | 7/1990 | Sakamoto et al. | |
| 4,969,614 A * | 11/1990 | Capuani | B64C 15/12 |
| | | | 244/12.3 |
| 5,016,837 A | 5/1991 | Willis | |
| 5,062,588 A | 11/1991 | Garland | |
| 5,071,088 A * | 12/1991 | Betts | B64C 29/0066 |
| | | | 244/12.1 |
| 5,074,759 A | 12/1991 | Cossairt | |
| 5,098,034 A * | 3/1992 | Lendriet | B64C 3/385 |
| | | | 244/12.5 |
| 5,167,383 A * | 12/1992 | Nozaki | B64C 9/20 |
| | | | 244/12.5 |
| 5,205,119 A | 4/1993 | Bulman | |
| 5,214,914 A | 6/1993 | Billig et al. | |
| 5,328,098 A | 7/1994 | Barcza et al. | |
| 5,372,337 A | 12/1994 | Kress et al. | |
| 5,398,499 A | 3/1995 | Urruela | |
| 5,769,317 A | 6/1998 | Sokhey et al. | |
| 5,799,874 A | 9/1998 | Eigenbrode et al. | |
| 5,924,632 A | 7/1999 | Seiner et al. | |
| 5,992,140 A | 11/1999 | Hammond et al. | |
| 5,992,792 A * | 11/1999 | Arnason | B64C 9/38 |
| | | | 244/13 |
| 6,003,301 A | 12/1999 | Bratkovich et al. | |
| 6,082,635 A | 7/2000 | Seiner et al. | |
| 6,105,901 A | 8/2000 | Ulanoski et al. | |
| 6,295,805 B1 | 10/2001 | Lackey et al. | |
| 6,318,668 B1 | 11/2001 | Ulanoski et al. | |
| 6,336,319 B1 | 1/2002 | Koshoffer | |
| 6,382,559 B1 | 5/2002 | Sutterfield et al. | |
| 6,751,944 B2 | 6/2004 | Lair | |
| 6,808,140 B2 * | 10/2004 | Moller | B64C 3/56 |
| | | | 244/12.5 |
| 6,866,503 B2 | 3/2005 | Ladharam | |
| 6,877,960 B1 | 4/2005 | Presz, Jr. et al. | |
| 6,880,784 B1 | 4/2005 | Wilkinson et al. | |
| 6,926,229 B2 | 8/2005 | Cummings et al. | |
| 6,983,587 B2 | 1/2006 | Shumate | |
| 7,032,835 B2 | 4/2006 | Murphy et al. | |
| 7,128,082 B1 | 10/2006 | Cerretelli et al. | |
| 7,290,738 B1 | 11/2007 | Rogers et al. | |
| 7,753,309 B2 | 7/2010 | Garreau | |
| 7,788,899 B2 | 9/2010 | Smith | |
| D626,056 S | 10/2010 | Garreau | |
| 7,823,838 B1 * | 11/2010 | De ning | B64C 9/38 |
| | | | 244/12.5 |

(56) References Cited

U.S. PATENT DOCUMENTS

| | | | |
|---|---|---|---|
| 7,878,458 B2 | 2/2011 | Shmilovich et al. | |
| 7,878,798 B2 * | 2/2011 | Poe | F23D 14/08 |
| | | | 431/115 |
| 8,087,618 B1 | 1/2012 | Shmilovich et al. | |
| D665,333 S | 8/2012 | Oliver | |
| 8,240,125 B2 * | 8/2012 | Kawai | B64C 15/02 |
| | | | 239/265.17 |
| 8,251,306 B2 | 8/2012 | Dacre | |
| 8,302,903 B2 | 11/2012 | Morgan et al. | |
| 8,529,247 B2 | 9/2013 | Poe et al. | |
| 8,657,053 B2 | 2/2014 | Novikov-Kopp | |
| 8,769,959 B2 | 7/2014 | Baker et al. | |
| 8,844,264 B2 | 9/2014 | Khalid | |
| 8,910,482 B2 | 12/2014 | Parham | |
| D724,001 S | 3/2015 | Garreau | |
| 9,499,266 B1 | 11/2016 | Garreau | |
| 9,714,082 B2 | 7/2017 | Shmilovich et al. | |
| 2004/0036185 A1 | 2/2004 | Garcia | |
| 2006/0000943 A1 | 1/2006 | Ouellette et al. | |
| 2006/0027679 A1 | 2/2006 | Gratteau | |
| 2006/0151633 A1 | 7/2006 | Presz, Jr. et al. | |
| 2008/0315042 A1 | 12/2008 | Evulet et al. | |
| 2009/0108141 A1 | 4/2009 | Shmilovich et al. | |
| 2009/0158705 A1 | 6/2009 | Grossi | |
| 2009/0212166 A1 | 8/2009 | Garreau | |
| 2009/0214338 A1 | 8/2009 | Werle et al. | |
| 2010/0019079 A1 | 1/2010 | Evulet et al. | |
| 2010/0162679 A1 | 7/2010 | Khalid | |
| 2010/0181433 A1 | 7/2010 | Catino | |
| 2011/0215204 A1 | 9/2011 | Evulet | |
| 2013/0087632 A1 | 4/2013 | Germain | |
| 2013/0336781 A1 | 12/2013 | Rolt et al. | |
| 2013/0343866 A1 | 12/2013 | Christians | |
| 2014/0352276 A1 | 12/2014 | Chen et al. | |
| 2014/0373546 A1 | 12/2014 | Ammon et al. | |
| 2016/0375986 A1 * | 12/2016 | Shmilovich | B64C 21/04 |
| | | | 244/207 |
| 2017/0060140 A1 * | 3/2017 | Harrison | B64C 9/38 |

FOREIGN PATENT DOCUMENTS

| | | |
|---|---|---|
| CN | 103419933 A | 12/2013 |
| DE | 1024364 B | 2/1958 |
| EP | 0078245 A1 | 5/1983 |
| EP | 0244336 A2 | 11/1987 |
| EP | 0739291 B1 | 4/2001 |
| GB | 1332026 A | 10/1973 |
| GB | 2451347 A | 1/2009 |
| GB | 2508023 A | 5/2014 |
| WO | 9620867 A1 | 7/1996 |
| WO | 2005099380 A2 | 10/2005 |
| WO | 2013037610 A1 | 3/2013 |
| WO | 2014199351 A1 | 12/2014 |

OTHER PUBLICATIONS

European Extended Search Report for Application No. 18165126.6, dated Jun. 6, 2018, 8 pages.

European Extended Search Report for Application No. 18165121.7, dated Jun. 6, 2018, 8 pages.

European Extended Search Report for Application No. 16855888.0, dated Apr. 16, 2019, 8 pages.

* cited by examiner

EJECTOR AND AIRFOIL CONFIGURATIONS

PRIORITY CLAIM

This application claims priority to U.S. Provisional Application No. 62/213,465, filed Sep. 2, 2015, the entire disclosure of which is hereby incorporated by reference as if fully set forth herein.

COPYRIGHT NOTICE

This disclosure is protected under United States and International Copyright Laws. © 2016 Jetoptera. All rights reserved. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND

Aircrafts that can hover, take off and land vertically are commonly referred to as Vertical Take-Off and Landing (VTOL) aircrafts. This classification includes fixed-wing aircrafts as well as helicopters and aircraft with tilt-able powered rotors. Some VTOL aircrafts can operate in other modes as well, such as Short Take-Off and Landing (STOL). VTOL is a subset of V/STOL (Vertical and/or Short Take-off and Landing).

For illustrative purposes, an example of a current aircraft that has VTOL capability is the F-35 Lightning. Conventional methods of vectoring the vertical lift airflow includes the use of nozzles that can be swiveled in a single direction along with the use of two sets of flat flapper vanes arranged 90 degrees to each other and located at the external nozzle. The propulsion system of the F-35 Lightning, similarly, provides vertical lifting force using a combination of vectored thrust from the turbine engine and a vertically oriented lift fan. The lift fan is located behind the cockpit in a bay with upper and lower clamshell doors. The engine exhausts through a three-bearing swivel nozzle that can deflect the thrust from horizontal to just forward of vertical. Roll control ducts extend out in each wing and are supplied with their thrust with air from the engine fan. Pitch control is affected via lift fan/engine thrust split. Yaw control is through yaw motion of the engine swivel nozzle. Roll control is provided by differentially opening and closing the apertures at the ends of the two roll control ducts. The lift fan has a telescoping "D"-shaped nozzle to provide thrust deflection in the forward and aft directions. The D-nozzle has fixed vanes at the exit aperture.

The design of an aircraft or drone more generally consists of its propulsive elements and the airframe into which those elements are integrated. Conventionally, the propulsive device in aircrafts can be a turbojet, turbofan, turboprop or turboshaft, piston engine, or an electric motor equipped with a propeller. The propulsive system (propulsor) in small unmanned aerial vehicles (UAVs) is conventionally a piston engine or an electric motor which provides power via a shaft to one or several propellers. The propulsor for a larger aircraft, whether manned or unmanned, is traditionally a jet engine or a turboprop. The propulsor is generally attached to the fuselage or the body or the wings of the aircraft via pylons or struts capable of transmitting the force to the aircraft and sustaining the loads. The emerging mixed jet (jet efflux) of air and gases is what propels the aircraft in the opposite direction to the flow of the jet efflux.

Conventionally, the air stream efflux of a large propeller is not used for lift purposes in level flight and a significant amount of kinetic energy is hence not utilized to the benefit of the aircraft, unless it is swiveled as in some of the applications existing today (namely the Bell Boeing V-22 Osprey). Rather, the lift on most existing aircrafts is created by the wings and tail. Moreover, even in those particular VTOL applications (e.g., take-off through the transition to level flight) found in the Osprey, the lift caused by the propeller itself is minimal during level flight, and most of the lift force is nonetheless from the wings.

The current state of art for creating lift on an aircraft is to generate a high-speed airflow over the wing and wing elements, which are generally airfoils. Airfoils are characterized by a chord line extended mainly in the axial direction, from a leading edge to a trailing edge of the airfoil. Based on the angle of attack formed between the incident airflow and the chord line, and according to the principles of airfoil lift generation, lower pressure air is flowing over the suction (upper) side and conversely, by Bernoulli law, moving at higher speeds than the lower side (pressure side). The lower the airspeed of the aircraft, the lower the lift force, and higher surface area of the wing or higher angles of incidence are required, including for take-off.

Large UAVs make no exception to this rule. Lift is generated by designing a wing airfoil with the appropriate angle of attack, chord, wingspan, and camber line. Flaps, slots and many other devices are other conventional tools used to maximize the lift via an increase of lift coefficient and surface area of the wing, but it will be generating the lift corresponding to at the air-speed of the aircraft. (Increasing the area (S) and lift coefficient (CO allow a similar amount of lift to be generated at a lower aircraft airspeed (VO) according to the formula $L=\frac{1}{2}\rho V^2 S C_L$, but at the cost of higher drag and weight.) These current techniques also perform poorly with a significant drop in efficiency under conditions with high cross winds.

While smaller UAVs arguably use the thrust generated by propellers to lift the vehicle, the current technology strictly relies on control of the electric motor speeds, and the smaller UAV may or may not have the capability to swivel the motors to generate thrust and lift, or transition to a level flight by tilting the propellers. Furthermore, the smaller UAVs using these propulsion elements suffer from inefficiencies related to batteries, power density, and large propellers, which may be efficient in hovering but inefficient in level flight and create difficulties and danger when operating due to the fast moving tip of the blades. Most current quadcopters and other electrically powered aerial vehicles are only capable of very short periods of flight and cannot efficiently lift or carry large payloads, as the weight of the electric motor system and battery may already be well exceeding 70% of the weight of the vehicle at all times of the flight. A similar vehicle using jet fuel or any other hydrocarbon fuel typically used in transportation will carry more usable fuel by at least one order of magnitude. This can be explained by the much higher energy density of the hydrocarbon fuel compared to battery systems (by at least one order of magnitude), as well as the lower weight to total vehicle weight ratio of a hydrocarbon fuel based system.

Accordingly, there is a need for enhanced efficiency, improved capabilities, and other technological advancements in aircrafts, particularly to UAVs and certain manned aerial vehicles.

BRIEF DESCRIPTION OF THE DRAWING FIGURES

DETAILED DESCRIPTION

This application is intended to describe one or more embodiments of the present invention. It is to be understood that the use of absolute terms, such as "must," "will," and the like, as well as specific quantities, is to be construed as being applicable to one or more of such embodiments, but not necessarily to all such embodiments. As such, embodiments of the invention may omit, or include a modification of, one or more features or functionalities described in the context of such absolute terms. In addition, the headings in this application are for reference purposes only and shall not in any way affect the meaning or interpretation of the present invention.

One embodiment of the present invention includes a propulsor that utilizes fluidics for the entrainment and acceleration of ambient air and delivers a high speed jet efflux of a mixture of the high pressure gas (supplied to the propulsor from a gas generator) and entrained ambient air. In essence, this objective is achieved by discharging the gas adjacent to a convex surface. The convex surface is a so-called Coanda surface benefitting from the Coanda effect described in U.S. Pat. No. 2,052,869 issued to Henri Coanda on Sep. 1, 1936. In principle, the Coanda effect is the tendency of a jet-emitted gas or liquid to travel close to a wall contour even if the direction of curvature of the wall is away from the axis of the jet. The convex Coanda surfaces discussed herein with respect to one or more embodiments does not have to consist of any particular material.

Figure 1:
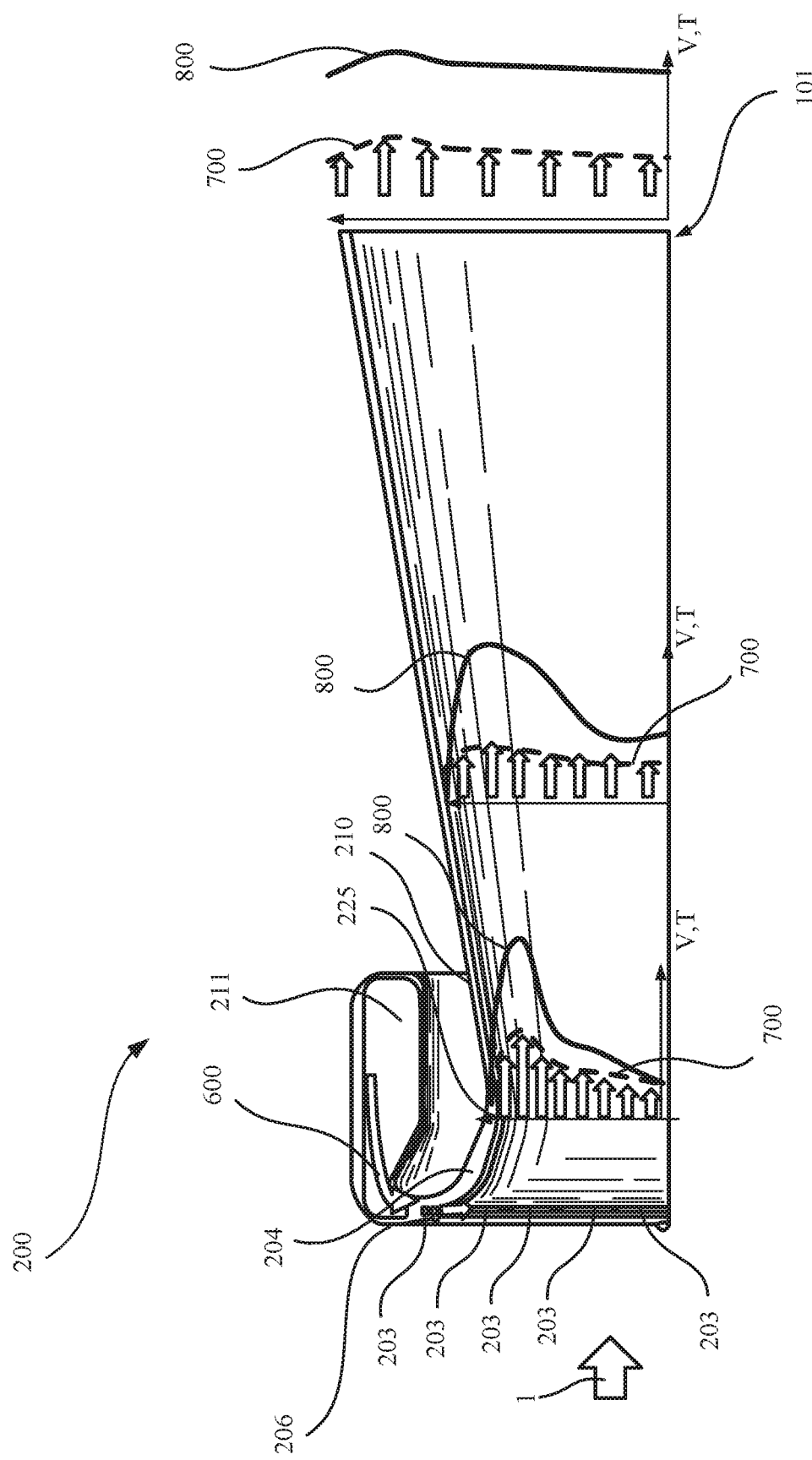
FIG. 1 is a cross-section of one embodiment of the present invention depicting the upper half of an ejector and profiles of velocity and temperature within the internal flow.

FIG. 1 illustrates a cross-section of the upper half of an ejector 200 that may be attached to a vehicle (not shown), such as, for non-limiting example, a UAV or a manned aerial vehicle such as an airplane. A plenum 211 is supplied with hotter-than-ambient air (i.e., a pressurized motive gas stream) from, for example, a combustion-based engine that may be employed by the vehicle. This pressurized motive gas stream, denoted by arrow 600, is introduced via at least one conduit, such as primary nozzles 203, to the interior of the ejector 200. More specifically, the primary nozzles 203 are configured to accelerate the motive fluid stream 600 to a variable predetermined desired velocity directly over a convex Coanda surface 204 as a wall jet. Additionally, primary nozzles 203 provide adjustable volumes of fluid stream 600. This wall jet, in turn, serves to entrain through an intake structure 206 secondary fluid, such as ambient air denoted by arrow 1, that may be at rest or approaching the ejector 200 at non-zero speed from the direction indicated by arrow 1. In various embodiments, the nozzles 203 may be arranged in an array and in a curved orientation, a spiraled orientation, and/or a zigzagged orientation.

The mix of the stream 600 and the air 1 may be moving purely axially at a throat section 225 of the ejector 200. Through diffusion in a diffusing structure, such as diffuser 210, the mixing and smoothing out process continues so the profiles of temperature (800) and velocity (700) in the axial direction of ejector 200 no longer have the high and low values present at the throat section 225, but become more uniform at the terminal end 101 of diffuser 210. As the mixture of the stream 600 and the air 1 approaches the exit plane of terminal end 101, the temperature and velocity profiles are almost uniform. In particular, the temperature of the mixture is low enough to be directed towards an airfoil such as a wing or control surface.

Figure 2:
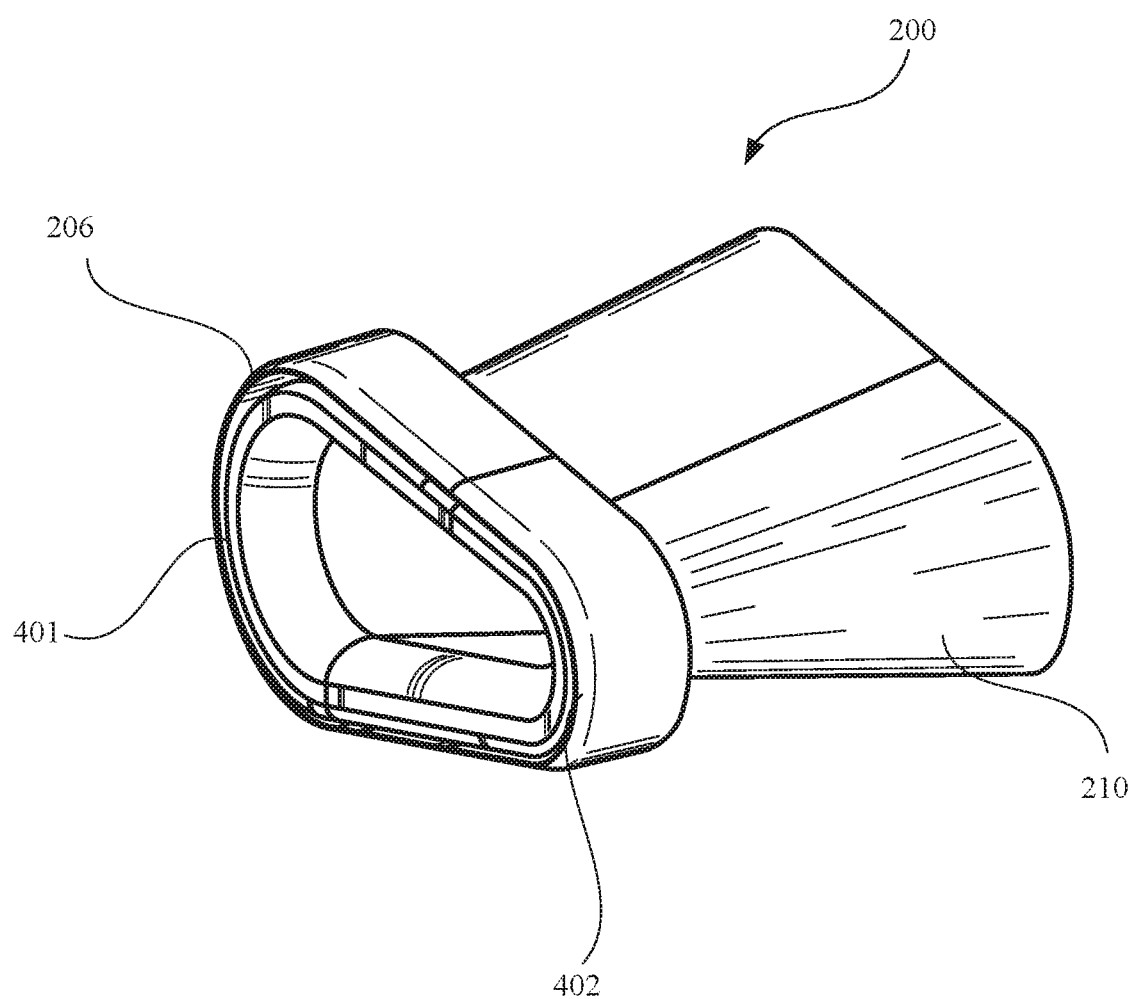
FIG. 2 illustrates a partial perspective view of an intake structure according to an embodiment.

In an embodiment, intake structure 206 and/or terminal end 101 may be circular in configuration. However, in varying embodiments, and as best shown in FIG. 2, intake structure 206, as well as terminal end 101, can be non-circular and, indeed, asymmetrical (i.e., not identical on both sides of at least one, or alternatively any-given, plane bisecting the intake structure). For example, as shown in FIG. 2, the intake structure 206 can include first and second lateral opposing edges 401, 402, wherein the first lateral opposing edge has a greater radius of curvature than the second lateral opposing edge. Terminal end 101 may be similarly configured.

Figure 3:
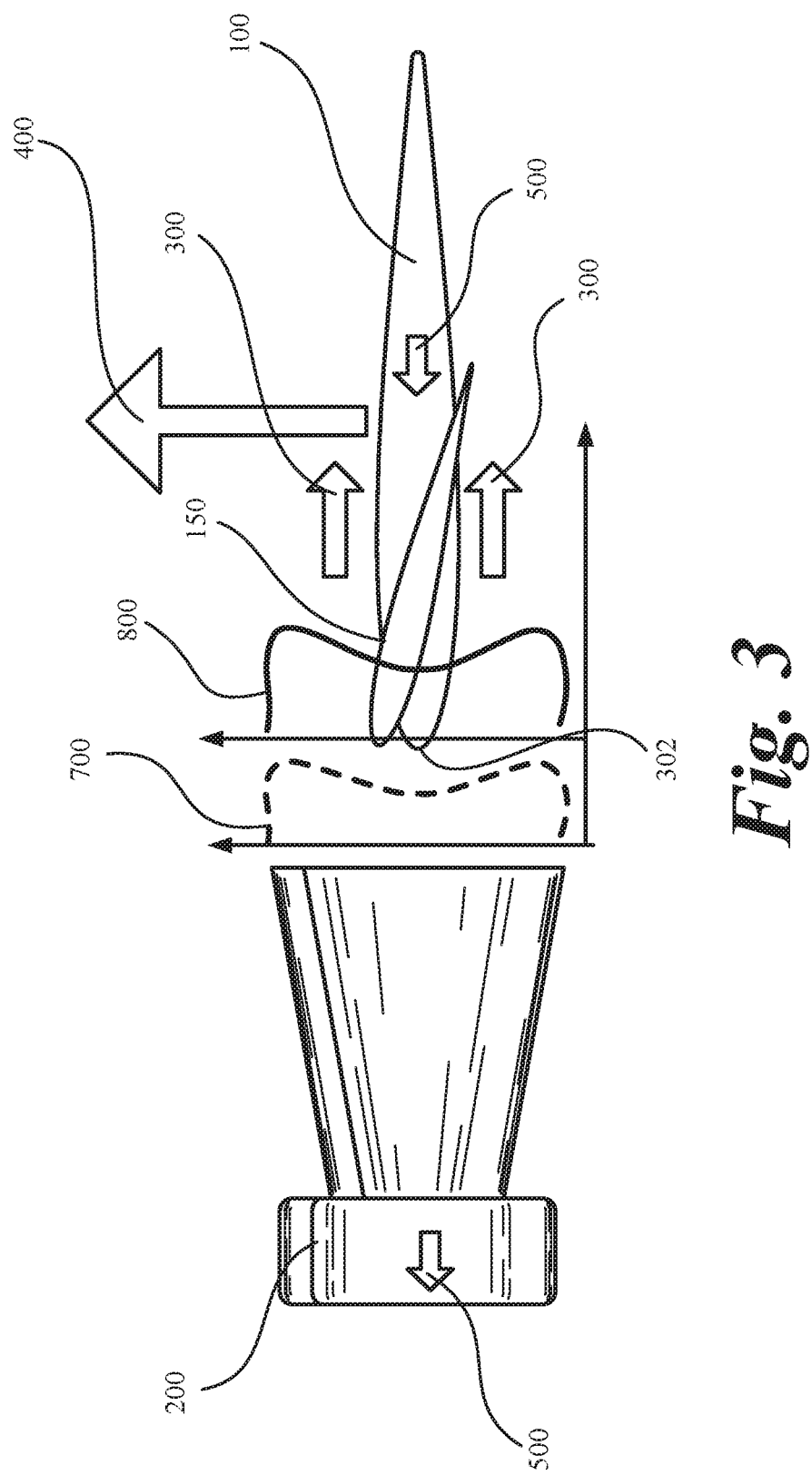
FIG. 3 illustrates a side plan view of an ejector placed in front of a control surface according to an embodiment.

FIG. 3 illustrates the propulsor/ejector 200, placed in front of a control surface, such as an airfoil 100 having a leading edge 302 and generating a lift force 400. As is illustrated, airfoil 100 is positioned directly behind (i.e., downstream) of outlet structure, such as terminal end 101 of diffuser 210, of ejector such that propulsive fluid from the ejector 200 flows over the airfoil. Indeed, in an embodiment, airfoil 100 may be positioned close enough to terminal end 101 such that only propulsive fluid from the ejector 200, exclusive of other ambient air, flows over airfoil. As used herein, the term "directly behind" may be construed to mean that at least a portion of leading edge 302 is within, or aligned with one of, the planes (a) occupied by surfaces of terminal end 101 that are parallel with the leading edge and (b) extending in the direction axial to ejector 200 (i.e., in the direction of arrows 300 discussed below).

The local flow over airfoil 100 is at higher speed than the speed of the aircraft, due to higher velocity of ejector 200 exit jet efflux, denoted by arrows 300, in comparison with aircraft airspeed denoted by arrow 500. The ejector 200 mixes vigorously the hotter motive stream 600 (FIG. 1) with the incoming cold ambient stream of air at high entrainment rate. Additional control surfaces can be implemented on the airfoil 100, such as elevator surface 150. In an embodiment the entirety of any such control surface is rotatable about an axis oriented parallel to the leading edge 302. By changing the angle of such surfaces 100 and/or 150, the attitude of the aircraft can rapidly be changed with little effort given the higher local velocity of the jet efflux 300. The mixture is homogeneous enough to reduce the hot motive stream 600 of the ejector temperature to a mixture temperature profile 800 that will not negatively impact the airfoils 100 or 150 mechanically or structurally. The velocity profile 700 of the efflux jet leaving the propulsor is such that it will allow more lift 400 to be generated by airfoil 100 due to higher local speeds.

Figure 4:
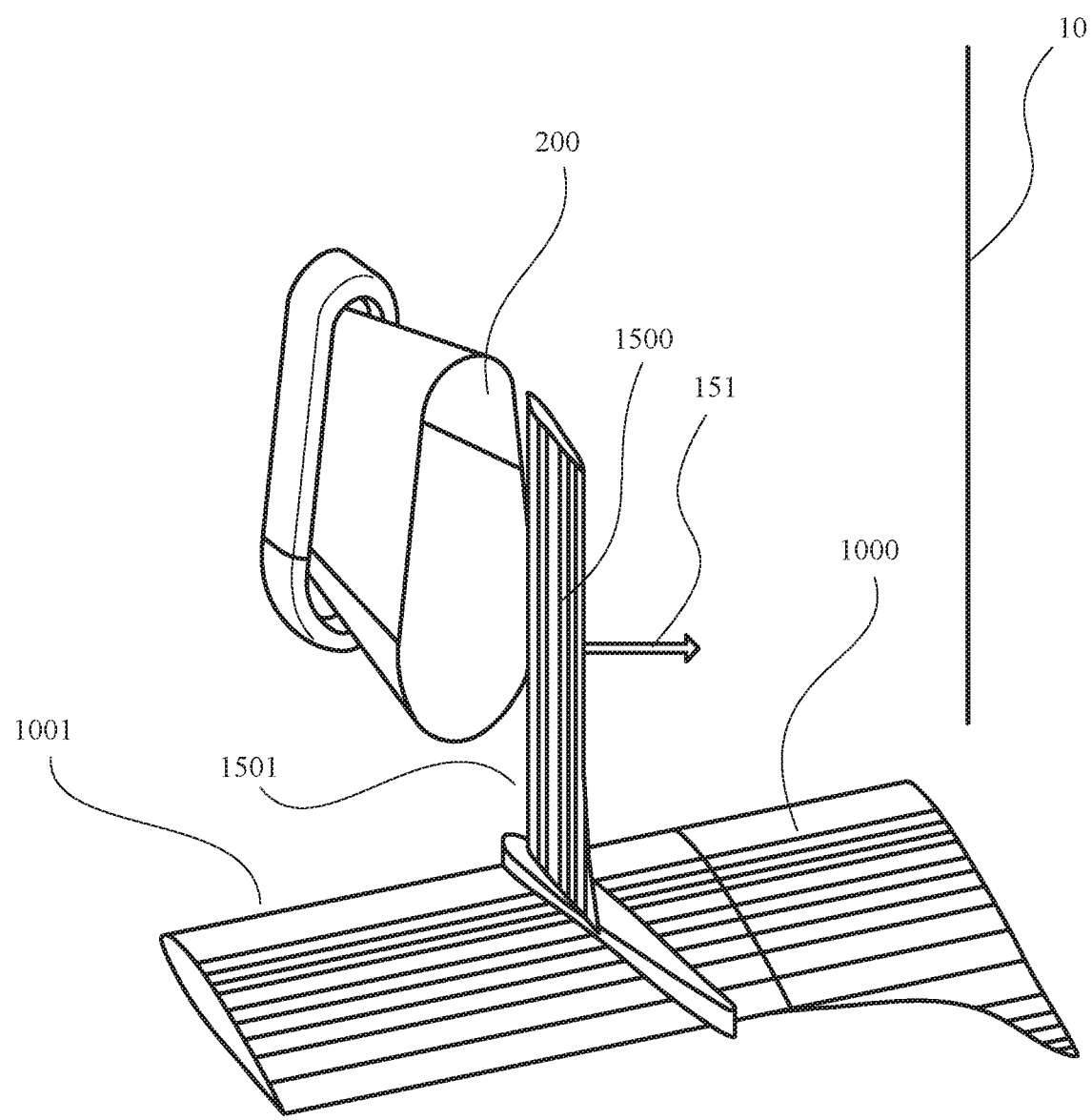
FIG. 4 is a perspective view of an ejector placed in front of a control surface in combination with another control surface according to an embodiment.

FIG. 4 illustrates that the propulsor/ejector 200 may also be placed in front of a control surface 1500 in combination with another airfoil 1000 and in a configuration different from that of control surfaces illustrated in FIG. 3. In the illustrated embodiment, leading edge 1501 of control surface 1500 is disposed at an approximately 90-degree angle with respect to leading edge 1001 of airfoil 1000. The ejector 200 may be a non-axisymmetric shape, and the control surface may be placed exactly in the wake of said ejector 200. The ejector 200 mixes vigorously the hotter motive stream 600 (FIG. 1) with the incoming cold ambient stream of air at high entrainment rate. Similarly, the mixture is homogeneous enough to reduce the hot motive stream 600 of the ejector temperature to a mixture temperature profile that will not negatively impact the control surface 1500 mechanically or structurally. In this embodiment, yaw can be controlled by changing the orientation of control surface 1500. In similar fashions, and by varying the orientation of a control surface 1500 with respect to a vehicle main body, such as an aircraft fuselage, pitch and roll may likewise be controlled. A function of ejector 200 is to generate thrust, but it can also provide lift or attitude control. In this embodiment, yaw control is in direction 151 creating a rotation around the aircraft axis 10.

Figure 5:
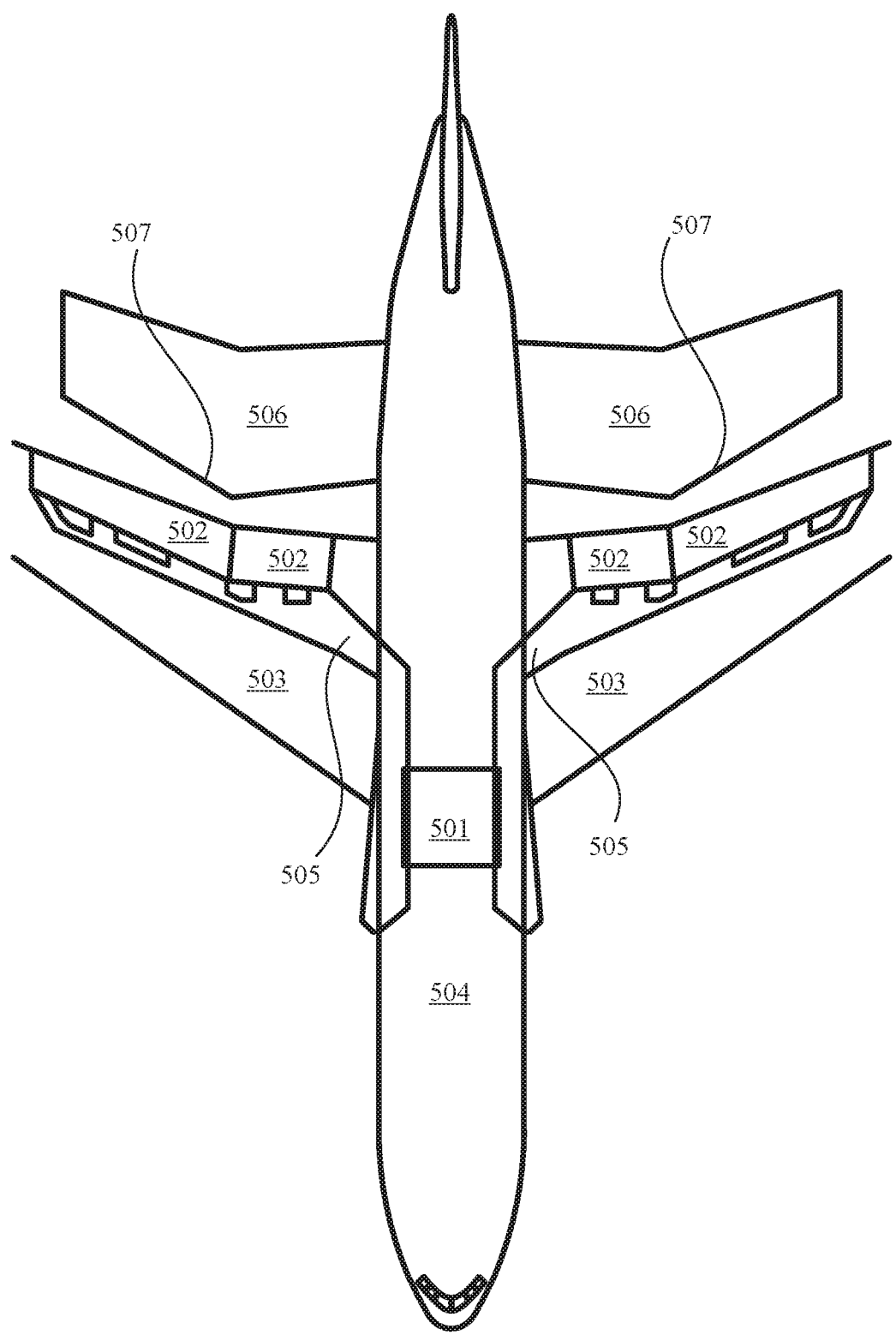
FIG. 5 is a top partial cross-sectional view of an alternative embodiment.

FIG. 5 illustrates an embodiment that provides an alternative to the traditional approach of placing jet engines on the wings of an aircraft to produce thrust. In FIG. 5, a gas generator 501 produces a stream of motive air for powering a series of ejectors 502 that are embedded in the primary airfoils, such as wings 503, for forward propulsion by emitting the gas stream directly from the trailing edge of the primary airfoils. In this embodiment, the gas generator 501 is embedded into the main-body fuselage 504 of the aircraft, is fluidly coupled to the ejectors 502 via conduits 505 and is the sole means of propulsion of the aircraft. Ejectors 502 may be circular or non-circular such as is the embodiment illustrated in FIG. 2, have correspondingly shaped outlet structure similar to terminal end 101 and provide, at a predetermined adjustable velocity, the gas stream from generator 501 and conduits 505. Additionally, ejectors 502 may be movable in a manner similar to that of flaps or ailerons, rotatable through a 180° angle and can be actuated to control the attitude of the aircraft in addition to providing the required thrust. Secondary airfoils 506 having leading edges 507 are placed in tandem with wings 503 and directly behind ejectors 502 such that the gas stream from the ejectors 502 flows over the secondary airfoils 506. The secondary airfoils 506 hence receive a much higher velocity than the airspeed of the aircraft, and as such creates a high lift force, as the latter is proportional to the airspeed squared. The entirety of the secondary airfoils 506 may be rotatable about an axis oriented parallel to the leading edges 507.

In this embodiment of the present invention, the secondary airfoil 506 will see a moderately higher temperature due to mixing of the motive fluid produced by the gas generator 501 (also referred to as the primary fluid) and the secondary fluid, which is ambient air, entrained by the motive fluid at a rate between 5-25 parts of secondary fluid per each primary fluid part. As such, the temperature that the secondary airfoil 506 sees is a little higher than the ambient temperature, but significantly lower than the motive fluid, allowing for the materials of the secondary wing to support and sustain the lift loads, according to the formula: $T_{mix} = (T_{motive} + ER \cdot T_{amb})/(1+ER)$ where $T_{mix}$ is the final fluid mixture temperature of the jet efflux emerging from the ejector 502, ER is the entrainment rate of parts of ambient air entrained per part of motive air, $T_{motive}$ is the hotter temperature of the motive or primary fluid, and $T_{amb}$ is the approaching ambient air temperature.

Figure 6:
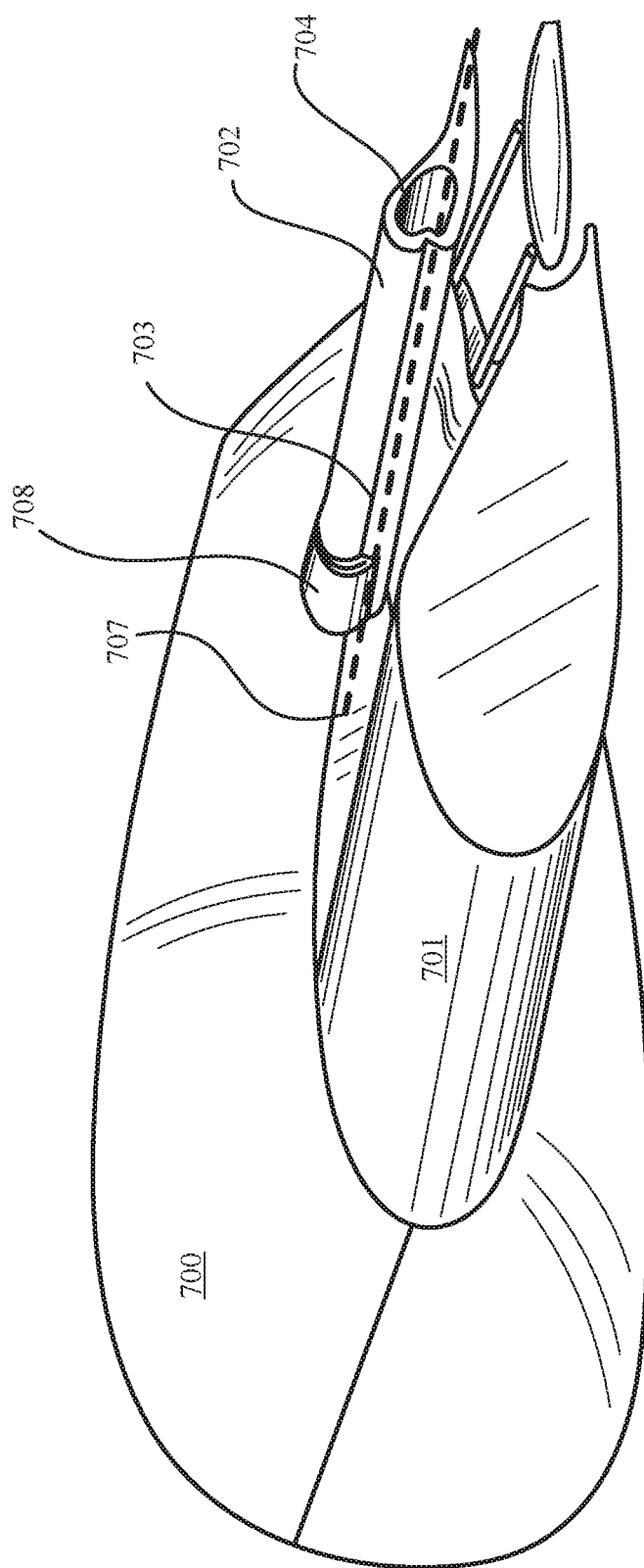
FIG. 6 is a side perspective view of an alternative embodiment.
Figure 7:
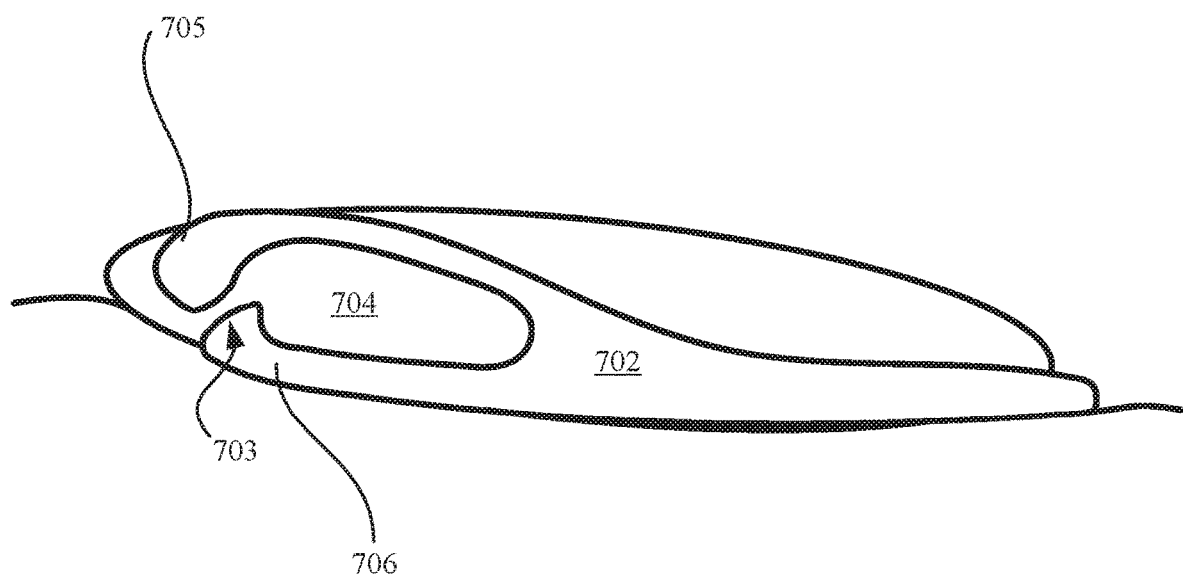
FIG. 7 is a side view of element of the embodiment illustrated in FIG. 6.

FIG. 6 illustrates a propulsion system for a vehicle 700 according to an alternative embodiment. A first augmenting airfoil 702 is coupled to the vehicle 700 and positioned downstream of fluid flowing over a primary airfoil 701 of the vehicle. Airfoil 702 is configured to rotate about axis 707 and controlled by an actuator 708. As best illustrated in FIG. 7, the first augmenting airfoil 702 includes a first output structure, such as opposing nozzle surfaces 705, 706 and at least one conduit, such as plenum 704, in fluid communication with a terminal end 703 defined by the nozzle surfaces. Nozzle surfaces 705, 706 may or may not include nozzles similar to nozzles 203 discussed above with reference to FIG. 1. Additionally, one or more of nozzle surfaces 705, 706 may include a convex surface that can, consequently, promote the Coanda effect and may have continuously rounded surfaces with no sharp or abrupt corners. Plenum 704 is supplied with hotter-than-ambient air (i.e., a pressurized motive gas stream) from, for example, a combustion-based engine that may be employed by the vehicle 700. Plenum 704 is configured to introduce this gas stream to the terminal end 703, which is configured to provide egress for the gas stream toward the primary airfoil 701 and out of the first augmenting airfoil 702.

Figure 8:
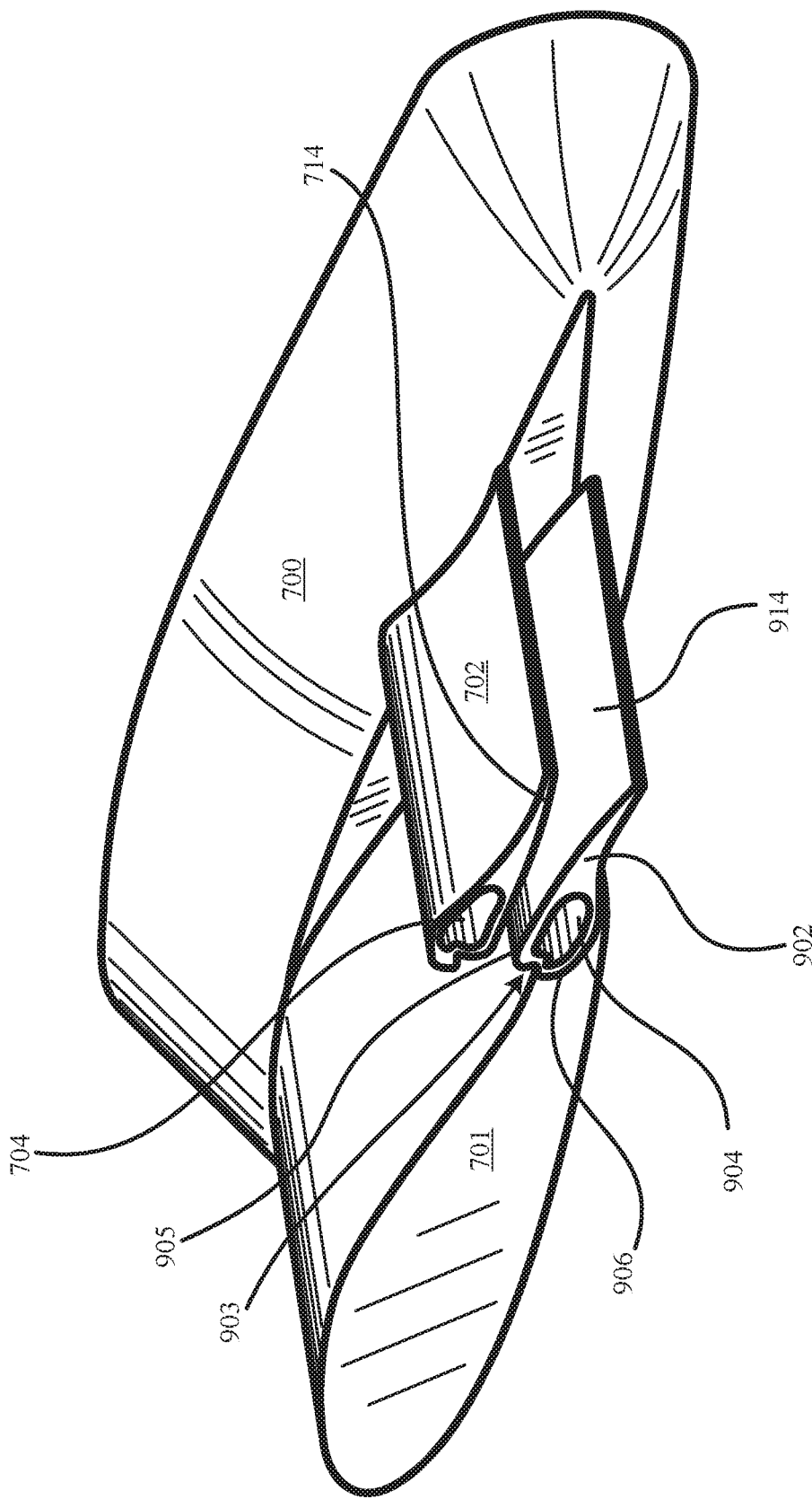
FIGS. 8-9 illustrate another alternative embodiment of the invention.
Figure 9:
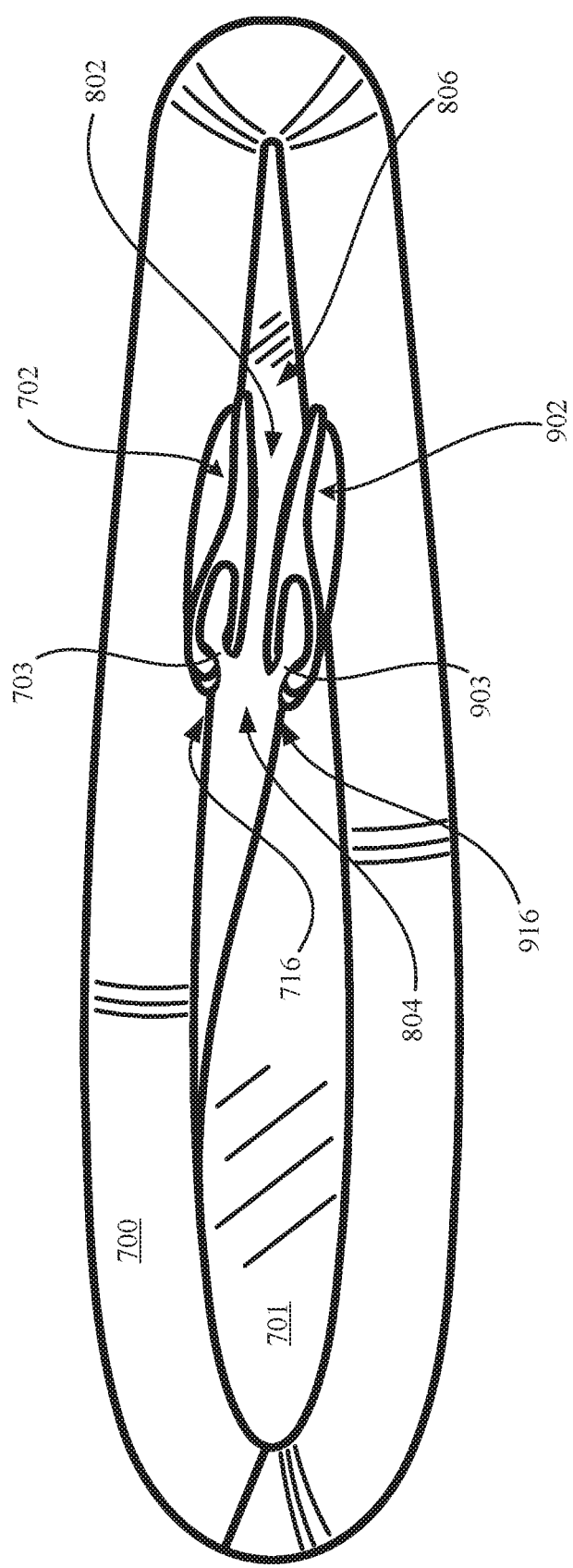

Referring to FIGS. 8-9, an embodiment may include a second augmenting airfoil 902 similar to airfoil 702, each with a respective trailing edge 714, 914 diverging from the other trailing edge. More particularly, second augmenting airfoil 902 is coupled to the vehicle 700 and positioned downstream of fluid flowing over the primary airfoil 701 of the vehicle. Airfoil 902 is configured to rotate in a manner similar to that discussed above with reference to airfoil 702. Airfoil 902 includes a first output structure, such as opposing nozzle surfaces 905, 906 and at least one conduit, such as plenum 904, in fluid communication with a terminal end 903 defined by the nozzle surfaces. Nozzle surfaces 905, 906 may or may not include nozzles similar to nozzles 203 discussed above with reference to FIG. 1. Additionally, one or more of nozzle surfaces 905, 906 may include a convex surface that can, consequently, promote the Coanda effect. Plenum 904 is supplied with hotter-than-ambient air (i.e., a pressurized motive gas stream) from, for example, a combustion-based engine that may be employed by the vehicle 700. Plenum 904 is configured to introduce this gas stream to the terminal end 903, which is configured to provide egress for the gas stream toward the primary airfoil 701 and out of the second augmenting airfoil 902.

Each of the first and second augmenting airfoils 702, 902 has a leading edge 716, 916 disposed toward the primary airfoil, with the first augmenting airfoil opposing the second augmenting airfoil. In operation, the first and second augmenting airfoils 702, 902 define a diffusing region 802, therebetween and along their lengths, similar in function to diffuser 210 discussed above herein. The leading edges 716, 916 define an intake region 804 configured to receive and introduce to the diffusing region 802 the gas streams from plena 704, 904 and the fluid flowing over the primary airfoil 701. The diffusing region 802 includes a primary terminal end 806 configured to provide egress from the diffusing region for the introduced gas streams and fluid flowing over the primary airfoil 701.

Figure 10:
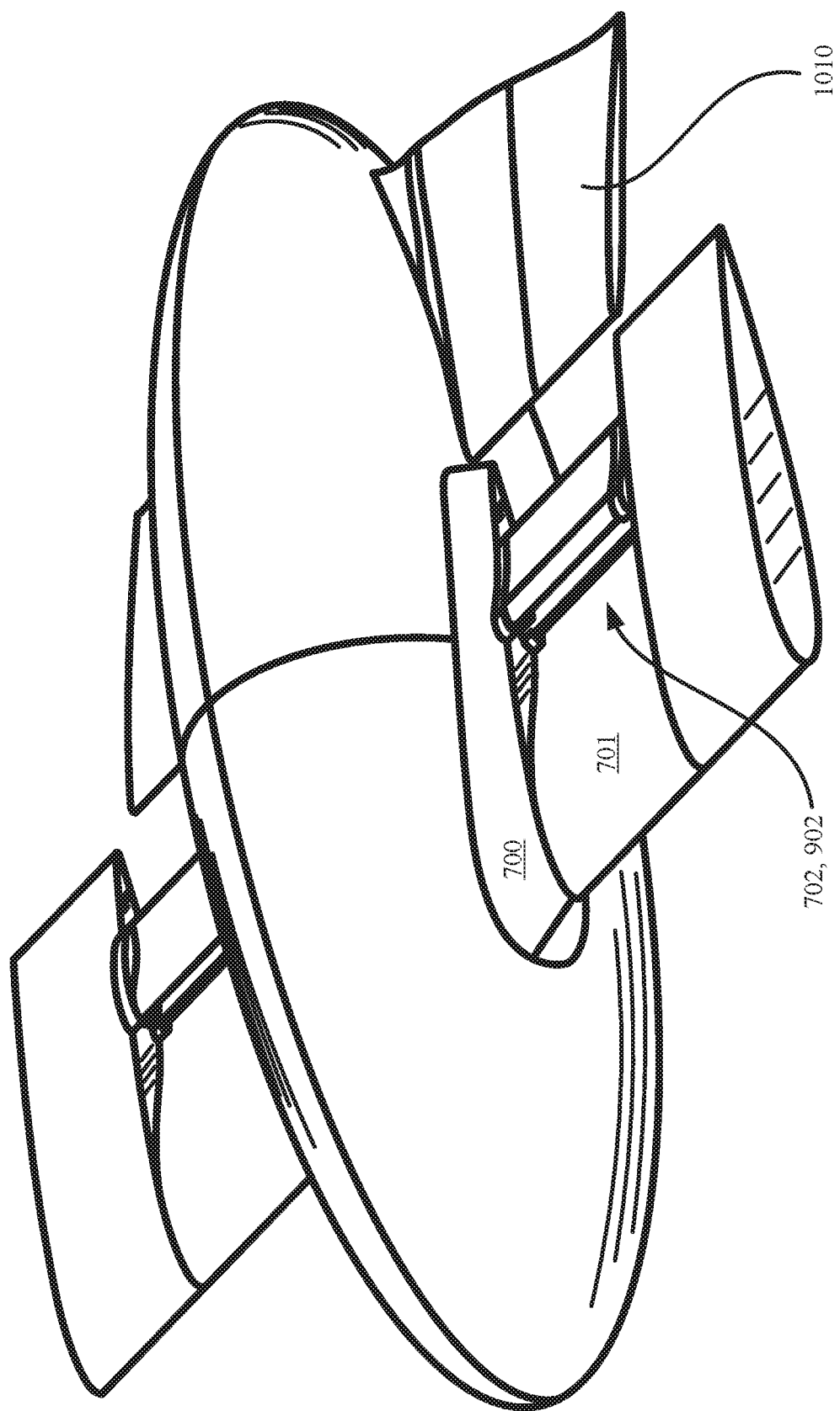
FIG. 10 illustrates yet another alternative embodiment of the invention.

FIG. 10 depicts an alternative embodiment of the present invention featuring tandem wings. In the illustrated embodiment, a secondary airfoil 1010 is placed directly downstream of the augmenting airfoils 702, 902 such that the fluid flowing over the primary airfoil 701 and the gas stream from the augmenting airfoils flows over the secondary airfoil. The combination of the two relatively shorter wings 701, 1010 produce more lift than that of a much larger-spanned wing lacking the augmenting airfoils 702, 902 and that rely on a jet engine attached to a larger wing to produce thrust.

Although the foregoing text sets forth a detailed description of numerous different embodiments, it should be understood that the scope of protection is defined by the words of the claims to follow. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed is:

1. A propulsion system coupled to a vehicle, the system comprising:
   an ejector comprising an outlet structure out of which propulsive fluid flows at a predetermined adjustable velocity, the ejector further comprising a diffusing structure, at least one conduit coupled to the diffusing structure and configured to introduce to the diffusing structure a primary fluid produced by the vehicle, and an intake structure coupled to the diffusing structure and configured to introduce to the diffusing structure a secondary fluid accessible to the vehicle, wherein the diffusing structure comprises the outlet structure, and the propulsive fluid comprises the primary and secondary fluids; and
   a first control surface having a leading edge aligned with a plane extending in a direction axial to the ejector, the first control surface located directly downstream of the outlet structure such that propulsive fluid from the ejector exclusive of other ambient air flows over the first control surface.

2. The system of claim 1, wherein, during operation of the system, only propulsive fluid from the ejector flows over the first control surface.

3. The system of claim 1, wherein the ejector further comprises a convex surface, the diffusing structure is coupled to the convex surface, and the at least one conduit is coupled to the convex surface and configured to introduce the primary fluid to the convex surface.

4. The system of claim 1, wherein the entirety of the control surface is rotatable about an axis oriented parallel to the leading edge.

5. The system of claim 1, wherein the outlet structure is asymmetrical.

6. The system of claim 5, wherein the outlet structure comprises first and second lateral opposing edges, and the first lateral opposing edge has a greater radius of curvature than the second lateral opposing edge.

7. The system of claim 1, further comprising a second control surface having a leading edge and directly coupled to the vehicle, wherein the first control surface is coupled to the second control surface such that the leading edge of the first control surface is at a non-zero angle to the leading edge of the second control surface.

8. A vehicle, comprising:
   an ejector comprising an outlet structure out of which propulsive fluid flows at a predetermined adjustable velocity, the ejector further comprising a diffusing structure, at least one conduit coupled to the diffusing structure and configured to introduce to the diffusing structure a primary fluid produced by the vehicle, and an intake structure coupled to the diffusing structure and configured to introduce to the diffusing structure a secondary fluid accessible to the vehicle, wherein the diffusing structure comprises the outlet structure, and the propulsive fluid comprises the primary and secondary fluids; and
   a first control surface having a leading edge aligned with a plane extending in a direction axial to the entirety of the ejector, the first control surface located directly downstream of the outlet structure such that propulsive fluid from the ejector exclusive of other ambient air flows over the aligned leading edge of the first control surface.

9. The vehicle of claim 8, wherein, during operation of the vehicle, only propulsive fluid from the ejector flows over the first control surface.

10. The vehicle of claim 8, wherein the ejector further comprises a convex surface, the diffusing structure is coupled to the convex surface, and the at least one conduit is coupled to the convex surface and configured to introduce the primary fluid to the convex surface.

11. The vehicle of claim 8, wherein the entirety of the control surface is rotatable about an axis oriented parallel to the leading edge.

12. The vehicle of claim 8, wherein the outlet structure is asymmetrical.

13. The vehicle of claim 12, wherein the outlet structure comprises first and second lateral opposing edges, and the first lateral opposing edge has a greater radius of curvature than the second lateral opposing edge.

14. The vehicle of claim 8, further comprising a second control surface having a leading edge and directly coupled to the vehicle, wherein the first control surface is coupled to the second control surface such that the leading edge of the first control surface is at a non-zero angle to the leading edge of the second control surface.

* * * * *